(12) United States Patent
Lin

(10) Patent No.: US 8,081,790 B2
(45) Date of Patent: Dec. 20, 2011

(54) LOUDSPEAKER STRUCTURE OF ELECTRONIC DEVICE

(75) Inventor: Yi-Peng Lin, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 435 days.

(21) Appl. No.: 12/466,482

(22) Filed: May 15, 2009

(65) Prior Publication Data
US 2009/0304221 A1 Dec. 10, 2009

(30) Foreign Application Priority Data
Jun. 6, 2008 (CN) .......................... 2008 1 0302058

(51) Int. Cl.
*H04R 1/02* (2006.01)
(52) U.S. Cl. ......... 381/386; 381/392; 381/394; 381/395
(58) Field of Classification Search ................. 381/386, 381/392, 394, 395
See application file for complete search history.

(56) References Cited

U.S. PATENT DOCUMENTS
2006/0050917 A1* 3/2006 Skillicorn et al. ............ 381/384
2008/0062633 A1* 3/2008 Yamaguchi et al. .......... 361/683
* cited by examiner

*Primary Examiner* — Tu-Tu Ho
(74) *Attorney, Agent, or Firm* — Altis Law Group, Inc.

(57) ABSTRACT

A loudspeaker structure for an electronic device, comprising: a housing defining a frame portion, the frame portion comprises a front sound chamber and aback sound chamber; a loudspeaker secured within the frame portion; a speaker cover made of rubber materials and secured within the frame portion to seal the front sound chamber; a speaker seat made of rubber materials and secured within the frame portion to seal the back sound chamber; and a circuit board secured above the frame portion. The front sound chamber and the back sound chamber have comfortable tightness and ensure the sounds transmitting. Thereby, high quality sound is available.

15 Claims, 5 Drawing Sheets

LOUDSPEAKER STRUCTURE OF ELECTRONIC DEVICE

BACKGROUND

1. Field of the Invention

The invention relates to loudspeaker structures, and particularly to loudspeaker structures for portable electronic devices.

2. Description of related art

Loudspeaker structures are commonly used within the electronic devices. Referring to FIG. 5, the loudspeaker structure 60 typically includes a loudspeaker 62 secured in a frame portion 64 of a housing 63. The loudspeaker 62 has a front surface 622 and a rear surface 624. The frame portion 64 includes a bottom wall 642 and a mounting cavity 644 for receiving the loudspeaker 62. The bottom wall 642 defines an aperture 646 in the middle. The loudspeaker 62 is mounted within the mounting cavity 644 with the front surface 622 facing the sound aperture 646. A circuit board 66 is attached to the open end of the housing 63 and encloses the loudspeaker 62 inside the mounting cavity 644. The front surface 622, an inner peripheral wall 648 of the frame portion 64, and the bottom wall 642 together enclose a front sound chamber 640. The rear surface 624, the inner peripheral wall 648 and the circuit board 66 together enclose a back sound chamber 620. When the loudspeaker 62 generates sound, the sound passes through the sound aperture 646 to the outside.

However, the housing 63 and the loudspeaker 62 are typically made of plastic material or metal material without resiliency. When assembling the loudspeaker 62 into the frame portion 64, the loudspeaker 62, the housing 63 and the circuit board 66 may form some gaps therebetween. Due to the gaps, the front sound chamber 640 and the back sound chamber 620 cannot be completely sealed without leakage of sound. The sound from the loudspeaker 62 will leak out of the front sound chamber 640 and the back sound chamber 620 through the gaps, which would degrade the sound quality of the loudspeaker 62.

Therefore, there is room for improvement within the art.

BRIEF DESCRIPTION OF THE DRAWINGS

Many aspects of the disclosed the loudspeaker structure can be better understood with reference to the following drawings. These drawings are not necessarily drawn to scale, the emphasis instead being placed upon clearly illustrating the principles of the exemplary loudspeaker structure. Moreover, in the drawings like reference numerals designate corresponding parts throughout the several views. Wherever possible, the same reference numbers are used throughout the drawings to refer to the same or like elements of an embodiment.

DETAILED DESCRIPTION

The disclosed loudspeaker structure as follows is suitably used for portable electronic devices, such as mobile phones, personal digital assistants (PDAs), and the like.

Figure 1:
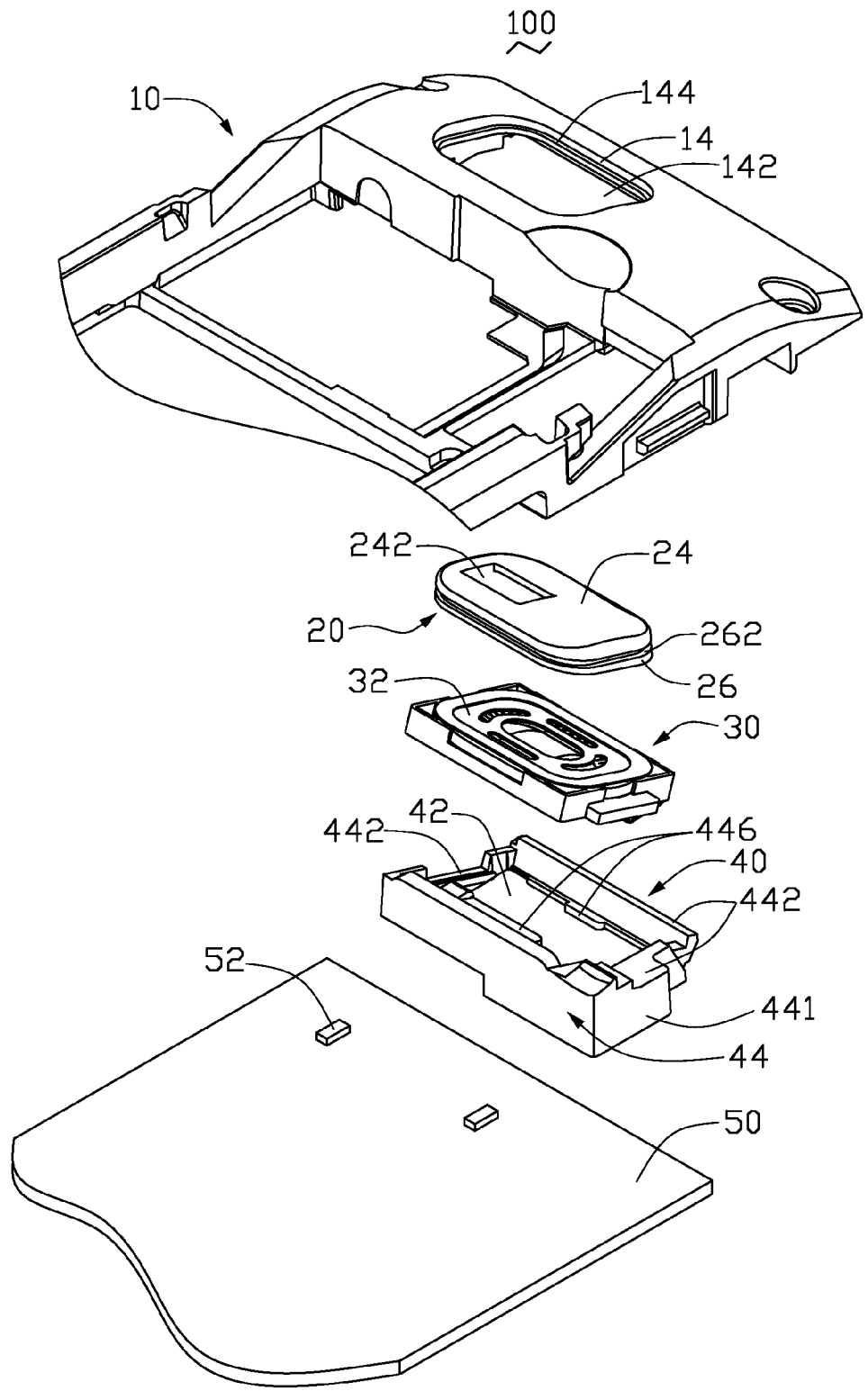
FIG. 1 is an exploded view of a loudspeaker structure of an electronic device according to an exemplary embodiment.

Referring to FIG. 1, the loudspeaker structure 100 includes a housing 10, a speaker cover 20, a loudspeaker 30, a speaker seat 40, and a circuit board 50.

Figure 2:
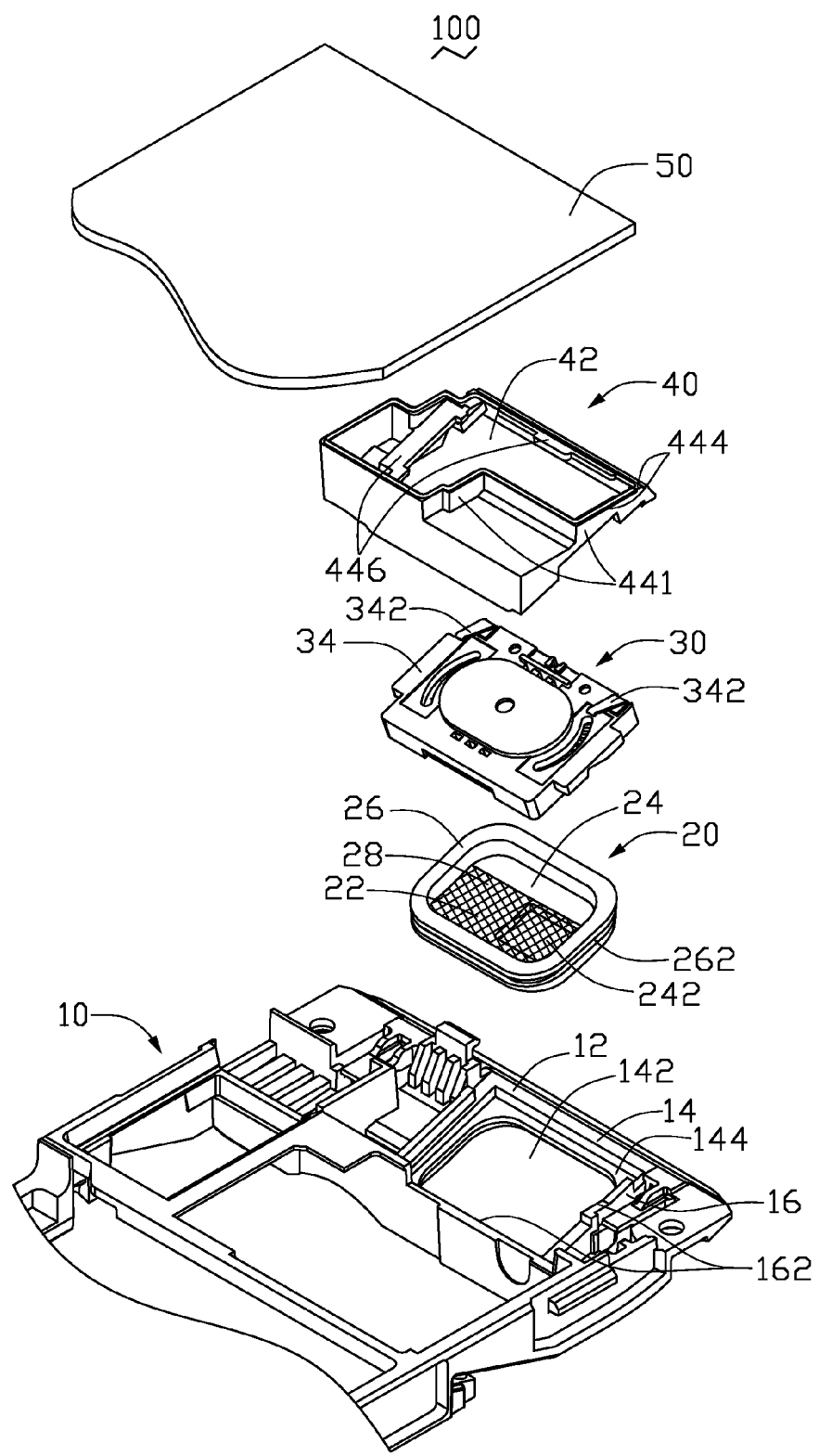
FIG. 2 is an another exploded view of the loudspeaker structure shown in FIG. 1.

Referring to FIG. 2, the housing 10 includes a generally rectangular frame portion 12. The frame portion 12 includes a lower peripheral sidewall 14 and an upper sidewall 16. The housing 10 further defines an opening 142, and the inner surface of the lower peripheral sidewall 14 forms a flange 144 around the opening 142 for abutting the speaker cover 20. The upper sidewall 16 includes a latching surface 162, and the latching surface 162 is formed at the top of the upper sidewall 16 for latching with the speaker seat 40.

The speaker cover 20 is made of rubber materials, and is a rectangular frame portion to latch in the opening 142. The speaker cover 20 defines a concave depression 22, having a bottom surface 24 and a peripheral sidewall 26. The bottom surface 24 defines a rectangular sound aperture 242. The bottom of the concave depression 22 is disposed with a web 28 covering the sound aperture 242. The outer portion of the peripheral sidewall 26 defines a receiving groove 262 around the peripheral sidewall 26 for latching with the flange 144.

The loudspeaker 30 includes a diaphragm 32 and a wiring connection surface 34 opposite to the diaphragm 32. Sound is generated from the diaphragm 32 of the loudspeaker 30. The wiring connection surface 34 has two connecting terminals 342 for electronically connecting the circuit board 50.

The speaker seat 40 is made of rubber materials also, and is a rectangular frame portion defines a receiving cavity 42 formed by a connecting sidewall 44. The connecting sidewall 44 includes four side walls 441 connecting with each other correspondingly. Each of the four walls 441 forms an upper flange 442 and a lower flange 444. The upper flange 442 corresponds to the latching surface 162 of the upper sidewall 16 and is configured for latching with the latching surface 162. The lower flange 444 is flat for latching with the circuit board 50. The interior surface of the connecting sidewall 44 forms a plurality of protrusions 446 thereon for latching the loudspeaker 30 inside the receiving cavity 42.

The circuit board 50 is a flat sheet forming two connecting dots 52 for electronically connecting to the two connecting terminals 342 of the loudspeaker 30, respectively.

Figure 3:
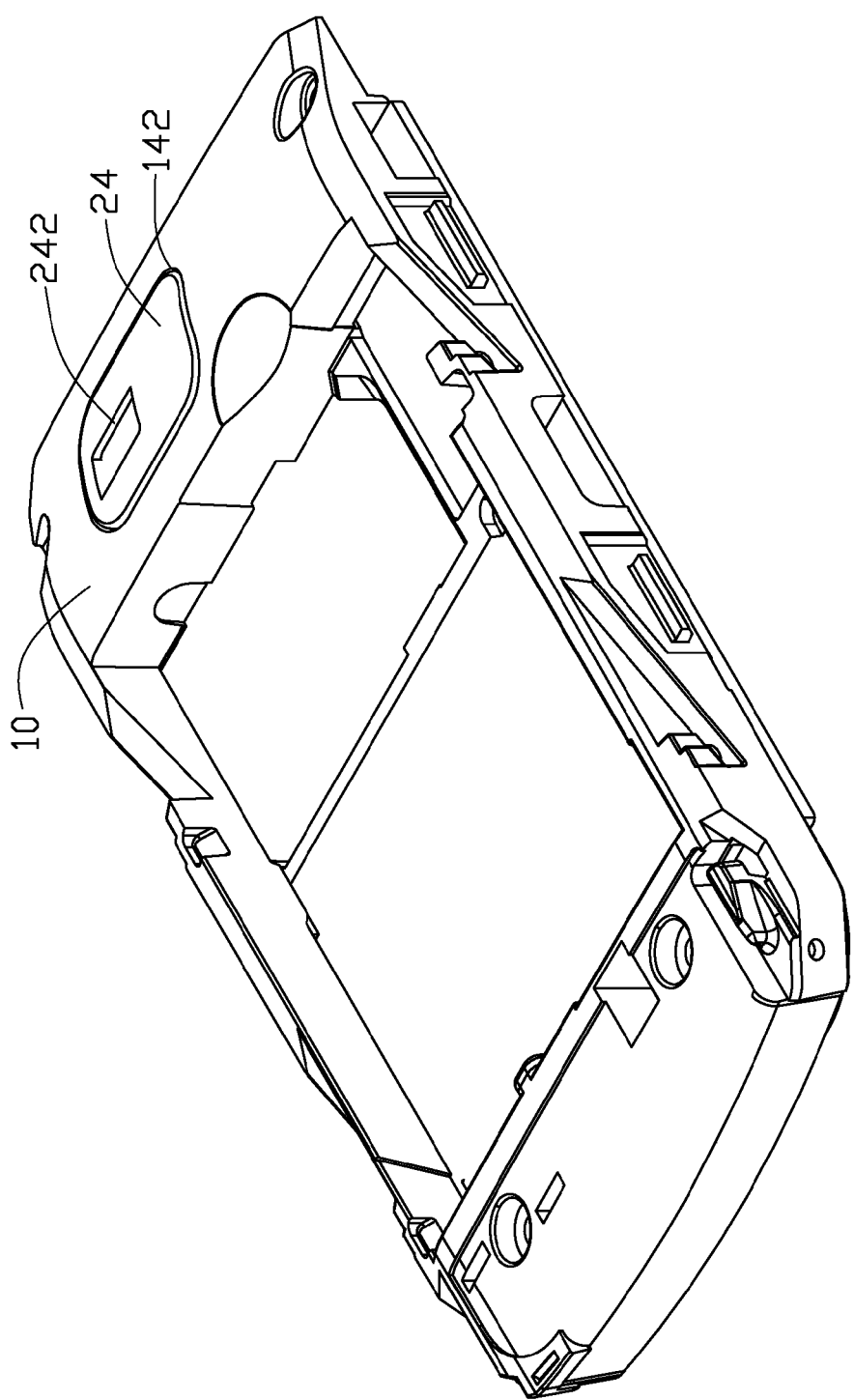
FIG. 3 is an assembled view of the loudspeaker structure shown in FIG. 1.
Figure 4:
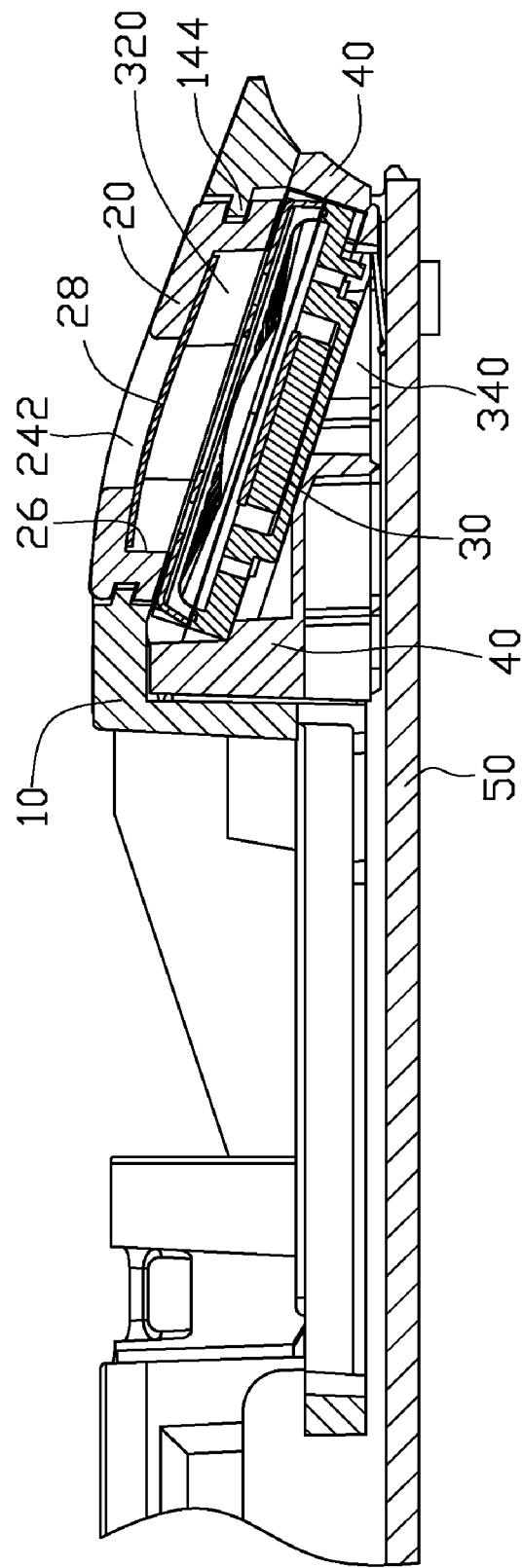
FIG. 4 is a sectional view of the loudspeaker structure illustrated in FIG. 3.
Figure 5:
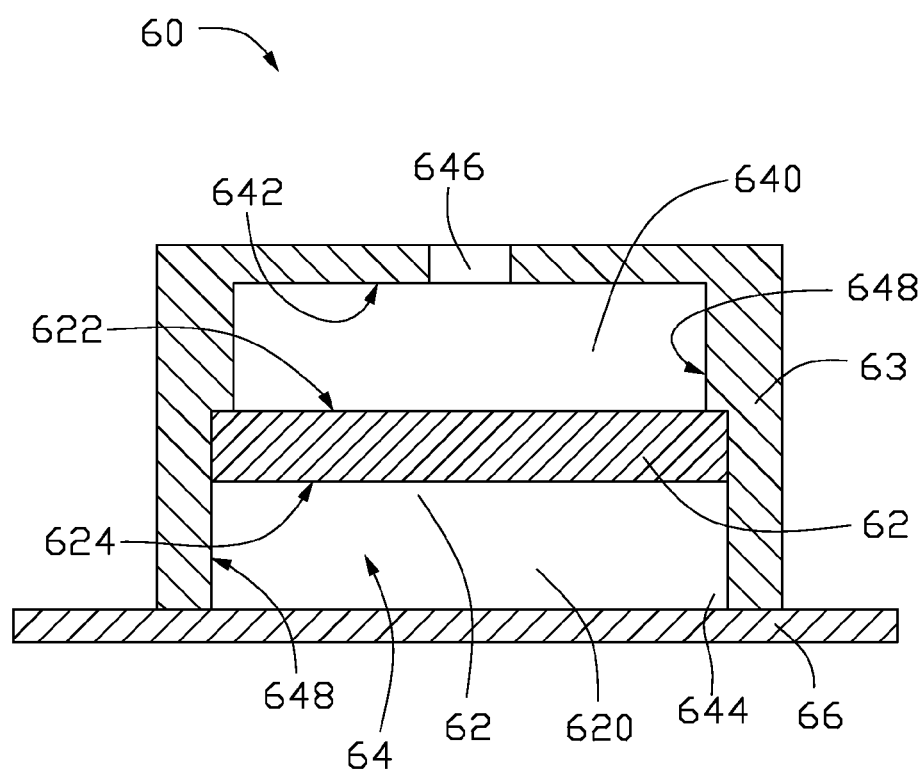
FIG. 5 is a sectional view of a typical loudspeaker structure of the related art.

Referring to FIGS. 3 and 4, during assembly, the speaker cover 20 can be mounted in the frame portion 12, the flange 144 of the opening 142 latches with the receiving groove 262 of the peripheral sidewall 26. The loudspeaker 30 can be inserted into the frame portion 12 and the diaphragm 32 of the loudspeaker 30 covers the concave depression 22 of the speaker cover 20 to define a front sound chamber 320. The speaker seat 40 can be mounted into the frame portion 12 with the upper flanges 442 of the connecting sidewall 44 resisting against the latching surface 162 of the upper sidewall 16. The loudspeaker 30 can be accommodated in the receiving cavity 42 of the speaker seat 40. The protrusions 446 of the speaker seat 40 supports the wiring connection surface 34 of the loudspeaker 30 to secure the loudspeaker 30. The lower flange 444 of the speaker seat 40 resists the circuit board 50. The connecting sidewall 44, the wiring connection surface 34 and the circuit board 50 cooperatively define a back sound chamber 340.

When the loudspeaker 30 generates sound, sound first passes through the web 28, and then the sound aperture 242, and finally the opening 142 of the housing 10 outwards. Because the speaker cover 20 and the speaker seat 40 are made of rubber materials, the front sound chamber 320 and the back sound chamber 340 may be tightly sealed, without any gaps in between. Thereby, preventing sound loss from the loudspeaker 30 and improving the quality of the sound.

Understandably, to change the size of the front sound chamber 320 and the back sound chamber 340, it is more convenient to change the size of the speaker cover 20 and the speaker seat 30 than to change the overall structure of the housing 10.

It is also to be understood, the web 28 can be replaced with a cotton pad. The web 28 can be omitted also.

What is claimed is:

1. A loudspeaker structure of an electronic device, comprising:
    a housing defining a frame portion;
    a circuit board covering the frame portion;
    a speaker cover made of rubber materials and mounted in the frame portion, latched with the housing;
    a speaker seat made of rubber materials and mounted in the frame portion, resisting against the circuit board at all times; and
    a loudspeaker mounted in the frame portion and latched between the speaker cover and the speaker seat.

2. The loudspeaker structure as claimed in claim 1, wherein the frame portion includes a lower peripheral sidewall, the lower peripheral sidewall defines an opening, the inner surface of the lower peripheral wall forms a flange, the speaker cover comprises a peripheral sidewall, the outside of the peripheral sidewall forms a receiving groove, the speaker cover latches with the housing by the receiving groove engaging with the flange.

3. The loudspeaker structure as claimed in claim 2, wherein the speaker cover includes a concave depression having a bottom surface, the bottom surface defines a sound aperture, and the loudspeaker structure further includes a web, the web is disposed in the concave depression, covering the sound aperture.

4. The loudspeaker structure as claimed in claim 3, wherein the loudspeaker comprises a diaphragm, and the diaphragm attaches to the peripheral sidewall of the speaker cover and forms a front sound chamber.

5. The loudspeaker structure as claimed in claim 1, wherein the frame portion includes an upper sidewall, the upper sidewall has a latching surface, the speaker seat includes a connecting sidewall, the connecting sidewall forms upper flanges, and the upper flanges engage with the latching surface.

6. The loudspeaker structure as claimed in claim 5, wherein the connecting sidewall forms a receiving cavity, and the inner surface of the connecting sidewall forms some protrusions, the loudspeaker is mounted in the receiving cavity, and the protrusions support the loudspeaker.

7. The loudspeaker structure as claimed in claim 5, wherein the connecting sidewall includes lower flanges, and the lower flanges latch with the circuit board.

8. The loudspeaker structure as claimed in claim 5, wherein the loudspeaker includes a wiring connection surface, the wiring connection surface has two connecting terminals, the circuit board has two connecting dots, and the two connecting dots connects the two connecting terminal respectively.

9. The loudspeaker structure as claimed in claim 8, wherein the wiring connection surface of loudspeaker, the connecting sidewall and the circuit board cooperatively define a back sound chamber.

10. A loudspeaker structure of electronic device, comprising:
    a housing defines a frame portion;
    a loudspeaker mounted in the frame portion;
    a circuit board covering the frame portion;
    a speaker cover made of rubber materials and mounted in the frame portion; and
    a speaker seat made of rubber materials and matched with the frame portion;
    wherein the speaker cover latched with the housing and the loudspeaker respectively, the speaker seat latched with the loudspeaker and resisting against the circuit board at all times, the loudspeaker latched between the speaker cover and the speaker seat.

11. A loudspeaker structure for an electronic device, comprising:
    a housing defining a frame portion, the frame portion comprises a front sound chamber and a back sound chamber;
    a loudspeaker secured within the frame portion;
    a speaker cover made of rubber materials and secured within the frame portion to seal the front sound chamber;
    a speaker seat made of rubber materials and secured within the frame portion to seal the back sound chamber; and
    a circuit board secured above the frame portion and resisting against the speaker seat at all times.

12. The loudspeaker structure as claimed in claim 11, wherein the loudspeaker comprises a diaphragm, the speaker cover comprises a peripheral sidewall, the diaphragm attaches to the peripheral sidewall and forms the front sound chamber.

13. The loudspeaker structure as claimed in claim 11, wherein the loudspeaker includes a wiring connection surface, the speaker seat includes a connecting sidewall, the wiring connection surface, the connecting sidewall and the circuit board cooperatively define the back sound chamber.

14. The loudspeaker structure as claimed in claim 13, wherein the frame portion includes an upper sidewall, the upper side wall has a latching surface, the connecting sidewall forms upper flanges, and the upper flanges engage with the latching surface.

15. The loudspeaker structure as claimed in claim 13, wherein the connecting sidewall includes lower flanges, and the lower flanges latch with the circuit board.

* * * * *